[3,471,572](tel:34715721)

HYDROPEROXIDES OF DDD AND ITS ANALOGUES
Douglas J. Hennessey, 47 Grayson Place,
Teaneck, N.J. 07666
No Drawing. Filed May 16, 1967, Ser. No. 638,730
Int. Cl. C07c *73/06, 25/20;* A01n *9/34*
U.S. Cl. 260—610    4 Claims

ABSTRACT OF THE DISCLOSURE

Insecticidal hydroperoxide derivatives of 1,1-bis(p-chlorophenyl)-2,2-dichloroethane and its analogues having the general structure

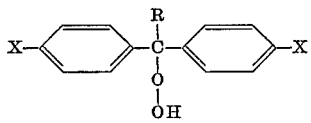

where X is Br, Cl, F, or H, and where R is dihalomethyl, trifluoromethyl or carb(lower) alkoxy. Methods for combatting insects using these compounds.

---

This invention relates to compounds which are hydroperoxide derivatives of certain analogues of DDT, particularly 1,1-bis(chlorophenyl)-2,2-dichloroethane (commonly known as DDD or TDE), which derivatives have useful insecticidal properties in themselves and which are useful intermediates in the production of other pesticidal compounds. The invention also relates to methods for the preparation of these compounds, to compositions containing these compounds and to methods for killing insects using these compounds and compositions.

In the years immediately following the discovery of the insecticidal properties of DDT, intensive research was undertaken to develop related compounds which would have equal or greater effectiveness against unwanted insects and, at the same time, would be less toxic to mammals. Among the compounds discovered was 1,1-bis (p-chlorophenyl)-2,2-dichloroethane,

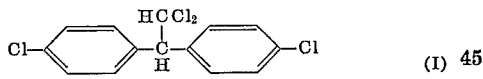   (I)

later to become familiarly known as DDD or TDE. With the continuous use of DDT, DDD and other similar analogues, it was soon found, however, that strains of insects developed which were resistant to these insecticides. This, in turn, lead to the development of additional DDT- analogues and to intensive research into the toxic mechanism of these compounds.

I have now discovered that oxidation of DDD and analogous compounds in the presence of bromine atoms yields a new class of hydroperoxide compounds having the following general structure

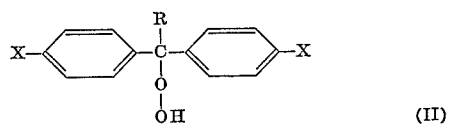   (II)

in which X represents fluorine, chlorine, bromine, or hydrogen; and R represents dihalomethyl whose halogen atoms are selected from fluorine, chlorine and bromine; trifluoromethyl; or carb (lower)alkoxy. The X and R substituents will, of course, be determined by the choice of starting compound.

The term "lower alkoxy" as used herein refers to saturated oxy-radicals having from 1 to 6 carbon atoms, including, for example methoxy, ethoxy, n-propoxy, isopropoxy, tert-butoxy, n-amyloxy, etc.

The bromine atoms, which are necessary to catalyze this reaction, are conveniently obtained by the use of liquid bromine in the presence of a light source. Alternatively, hydrogen bromide may be used.

Specifically, this reaction in the case of DDD proceeds according to the following scheme to yield 1,1-bis(p-chlorophenyl)-2,2-dichloroethyl hydroperoxide:

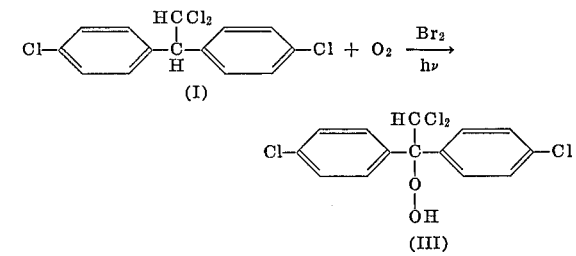

This reaction, which may be termed bromine-atom catalyzed aut-oxidation, yields when DDT is used, a number of oxidation products. The DDT hydroperoxide 1,1-bis (p-chlorophenyl) - 2,2 - trichloroethyl hydroperoxide, has been postulated as an intermediate for these oxidation products, but the compound has never been isolated. It is therefore surprising that, with analogous products, such as DDD and the trifluoro analogue of DDT, the hydroperoxide is obtained in substantial yields and can be isolated. When using DDD, in addition to obtaining the desired hydroperoxide compound (III), one also obtains the following additional oxidation products, which are analogous to those obtained by bromine atom catalyzed aut-oxidation of DDT:

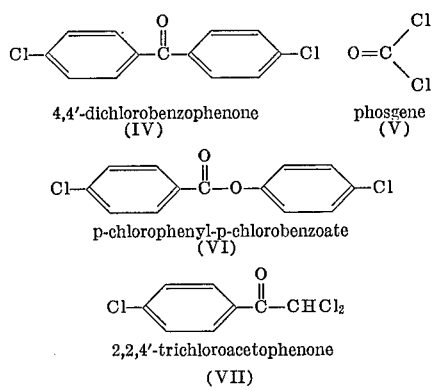

The amounts of the desired hydroperoxide vary greatly according to reaction conditions and the amount of catalyst present. For example, at temperatures of about 30° to 50° C., reaction time should be limited to between about 5 and 10 minutes. At lower temperatures the optimum time is somewhat higher. The amount of bromine present should be in the ratio of about 0.3 to 0.5 mole of bromine per mole of starting material. A source of irradiation is also necessary in order to obtain free bromine atoms to initiate the reaction; for this purpose, any convenient source of visible light may be used. Under proper reaction conditions, yields of hydroperoxide can be up to 75 or 80% or more of the theoretical stoichiometric amount. Specific reaction conditions are shown below in the examples. The choice of a proper solvent is critical in the practice of this invention. The solvent must be one in which the starting compounds are soluble and which is inert to the hydroperoxide product. Carbon tetrachloride has been discovered to be an excellent solvent, although hexachlorobutadiene and certain fluorinated hydrocarbons can also be used.

Although the reaction may be run at atmospheric pressure, one may also employ pressures up to about 50 p.s.i.

The general procedure involves adding to a solution of a starting compound (e.g. DDD) in a transparent vessel, the requisite amount of liquid bromine. The vessel is then illuminated and oxygen is bubbled therethrough. When the reaction is complete, the solvent, bromine, and other volatile materials may be conveniently removed under reduced pressure, and the hydroperoxide product may be obtained in a crystalline state.

It is preferrable, when preparing the hydroperoxide derivative of DDD that the starting compound be in a relatively pure state. Because technical grade DDD contains only approximately 70% of DDD, the commercial substance should first be purified by recrystallization from, e.g., ethanol or carbon tetrachloride. Samples of pure DDD were obtained from technical DDD according to the following methods. All temperatures in these examples and throughout this disclosure are given in degrees centigrade.

Example I 1300 grams of powdered technical DDD was dissolved in 1300 ml. of 95% of ethanol at reflux. After standing at room temperature for a period of 10 hours, then at 10° for a period of ½ hour, the material was filtered by suction. The solid residue was redissolved at reflux in 1300 ml. of 95% ethanol and the solution was allowed to stand over night at room temperature. The crystalline solid was again collected by suction filtration. The twice recrystallized material, weighing 815 grams, melted at 109–111°. Yield 63%.

Example II 900 grams of technical DDD was dissolved at reflux in 750 ml. of carbon tetrachloride. The resulting solution, upon standing overnight at room temperature, deposited crystals which when collected and washed with 100 ml. of cold carbon tetrachloride weighed 446 grams. The filtrate and washings when cooled to 2° and allowed to remain overnight, deposited another 64 grams. This was filtered and washed with 20 ml. of cold carbon tetrachloride. The combined filtrate and washings were then evaporated to ⅔ volume and again cooled to 2° and allowed to remain overnight. An additional 51 grams of crystalline product was then obtained. The total yield of pure DDD was 561 grams, melting at 110–111°. Yield 62%.

Using purified DDD, various ant-oxidation runs were made to determine optimum conditions for the reaction. Two aut-oxidation procedures were used. Although specific amounts of reacants and solvents are mentioned in the following general descriptions of these procedures, it will be realized that these can be varied considerably while still following the general procedures set fourth.

Procedure A.—A solution of 10 grams (0.0312 moles) of DDD and 1.6 grams (0.01 mole) of bromine in 200 ml. of carbon tetrachloride was placed in a 500 ml. round bottom flask and fitted with a gas dispersion inlet. The flask was immersed in a constant temperature water bath maintained at one of several selected temperatures between 7° and 18°. Oxygen was bubbled through the solution which was illuminated at a distance of 10 centimeters from the side of the flask by a 500 watt lamp. Aliquots were taken from time to time to determine the progress of the reaction. The length of time varied from 1 to 24 hours for aut-oxidation.

Procedure B.—To 10 grams (0.0312 mole) of DDD dissolved in 75 ml. of carbon tetrachloride was added 1.3 grams (0.00815 mole) of bromine. The solution was placed in a 500 ml. pressure bottle warmed to 50° C. The bottle was connected with rubber hose connected to the gage of an oxygen cylinder. Oxygen was introduced at 40 p.s.i. after purging the vessel. Two 150 watt lamps uniformly spaced at 6½ inch distances from the center of the reaction vessel illuminated the reaction solution which was shaken at 250 oscillations per minute for 4½ hours. The oxygen pressure ($O_2$ volume approximately 450 ml.) at first dropped to 24 p.s.i. within the first 7 minutes and then increased to 29 p.s.i. due to the heat generated by the lamps. The temperature of the solution at the end of the reaction rose to 68–70°.

After aut-oxidation, the solvent, bromine, and other volatile materials obtained from both general procedures described above were removed under reduced pressure (15 mm. Hg) in a rotary evaporator on a warm water bath having a temperature of 35–45°. 20 ml. of carbon tetrachloride was added and the solution was again evaporated.

The following specific Examples III through XII, show preparation of 1,1-bis(p-chlorophenyl)-2,2-dichloroethyl hydroperoxide (also termed "DDD hydroperoxide") from preparation of 1,1-bis(p-chlorophenyl)-2,2-dichloroethyl DDD, under various conditions and with various concentrations of catalyst and reactants.

EXAMPLE III

Procedure B was generally followed, using 20 grams (0.0624 mole) of DDD and 2.6 (0.016 mole) of bromine in carbon tetrachloride. The aut-oxidation reaction was run for 5¾ minutes at 40 p.s.i., at a temperature of 50–52°. A crude oily product cotnaining about 80% of hydroperoxide was obtained. The crude product was crystallized from carbon tetrachloride, 2 ml. per 1 gram of residue, and the crystalline product was filtered by suction, washed with carbon tetrachloride and air dried. The yield of crystalline product was 16.1 grams, containing 94% DDD hydroperoxide, melting point 64–66°. This represents 66.8% of the theoretical yield.

Example IV

Following procedure B, three runs of 10 grams each of technical grade DDD (containing 70–75% of DDD) in 95 ml. of carbon tetrachloride were run with 1.6 grams of bromine. Initial oxygen pressure was 40 p.s.i. Table I shows the duration of these runs, the temperatures and the yield of DDD hydroperoxide.

TABLE I

| | | | Yield of DDD hydroperoxide | |
| --- | --- | --- | --- | --- |
| | Time, minutes | Temperature, °C. | Grams | Percent of theoretical amount |
| Run No.: | | | | |
| 1 | 9 | 30–52 | 0.9 | 8 |
| 2 | 10 | 30–52 | 1.8 | 16 |
| 3 | 11 | 30–53 | 2.6 | 23 |

These data indicate that while technical DDD may be used as a starting material, the yields of DDD hydroperoxide are less satisfactory than are obtained by the use of purified DDD.

Example V

To develop possible alternate solvents for carbon tetrachloride, five runs were made using other solvents, following generally either procedure A or procedure B. Reaction conditions and results are set forth in Table II.

TABLE II

| Run No.: | Procedure | Solvent, amount | DDD, grams | Time, minutes | $O^2$ pressure, p.s.i. | Temp., °C. | DDD hydroperoxide yield percent of theoretical amount |
|---|---|---|---|---|---|---|---|
| 4 | A | Petroleum ether, 55 ml.; Methylene chloride, 15 ml | 5.0 | 120 |  | 10 | 0 |
| 5 | B | Chloroform, 25 ml | 1.25 | 10 | 20 | 40–42 | 0 |
| 6 | B | Dioxane, 25 ml.; Carbon tetrachloride, 25 ml | 6.4 | 24 | 30 | 45–55 | 0 |
| 7 | B | Hexachlorobutadiene, 75 ml | 10.0 | 6¾ | 40 | 60 | 62 |
| 8 | B | 1,1,2-trichloro-1,2,2-trifluoroethane | 2.0 | 6½ | 40 | 40–48 | 75 |

These data indicate that, of the alternate solvents tested, only hexachlorobutadiene and 1,1,2-trichloro-1,2,2-trifluoroethane were usable in the process. Neither of these solvents, however, appear to be as useful as carbon tetrachloride, because 1,1,2 - trichloro - 1,2,2 - trifluoroethane is too volatile and hexachlorobutadiene is too high-boiling. Furthermore, the low solubility of DDD in these solvents necessitates running these reactions under dilute conditions.

Example VI

Run No. 9 was made in the absence of light, in order to determine the necessity for irradiation in this process. 100 ml. of 10% DDD in carbon tetrachloride containing 1.6 g. of bromine were subjected to procedure B, for 2 hours and 15 minutes, in the absence of light. Initial oxygen pressure was 40 p.s.i., and the reaction system was heated from 47° to 57°. There was no evidence of oxygen uptake, and infrared spectrometry showed only unreacted DDD in the evaporation mixture. This run indicates the necessity for irradiation in order to catalyze the aut-oxidation reaction.

Example VII

Run No. 10 was made in the absence of bromine. 10 ml. of 5% DDD was subjected to procedure A at 55° for 7 hours and 10 minutes. There was no oxygen uptake. Infrared spectrometry showed only unreacted DDD.

Example VIII

Run No. 11 used hydrogen bromide as a catalyst rather than bromine. A solution of 2.15 grams of DDD (0.0068 mole) in 50 ml. of a 0.135 M carbon tetrachloride solution of hydrogen bromide (0.0068 mole) was subjected to procedure B for 7 minutes at 40–45° with an initial oxygen pressure of 20.8 p.s.i. During the first 5 minutes there was no appreciable color change in the solution. Suddenly the bromine color appeared and the oxygen pressure began to drop, indicating an oxygen uptake. A crude yield of 1.5 grams of DDD hydroperoxide was obtained, which was recrystallized to 1.2 grams, having a melting point of 53–55°. The yield was 50% of the theoretical amount. These data indicate that, in place of bromine, hydrogen bromide may be used as a catalyst.

Exampl IX

Run No. 12 attempted to use cumene hydroperoxide, a well-known free radical initiator, rather than bromine as a catalyst. A solution of 3.3 grams (0.0103 mole) of DDD in 33 ml. of carbon tetrachloride was subjected to procedure A, omitting bromine but using 1.52 grams (0.010 mole) of cumene hydroperoxide in 5 ml. of carbon tetrachloride added a little at a time over a period of 5 hours. At the initial temperature of 50°, no reaction occurred, and infrared spectrometry showed only unreacted DDD. The temperature of the solution was then raised to 65° for 30 minutes and further raised to 70°, carbon tetrachloride being added from time to time to keep the volume constant. No reaction occurred after 5 hours. This run shows that not all free radicals will serve as an initiator for this aut-oxidation reaction.

Example X

Following procedure B, 5% solutions of DDD in carbon tetrachloride were run using varying amounts of bromine. The time for all runs was 7 minutes, the temperature ranges were 39–44°, and oxygen pressure was 20 p.s.i. Table III shows the amounts of bromine used and the percentages of DDD hydroperoxide obtained.

TABLE III

| | Percent of $Br_2$ in $CCl_4$, wt./vol. | Moles $Br_2$/ mole DDD | DDD hydroperoxide yield percent of theoretical amount |
|---|---|---|---|
| Run No.: | | | |
| 13 | 0.48 | 0.19 | 52 |
| 14 | 0.64 | 0.26 | 67 |
| 15 | 0.80 | 0.32 | 75 |
| 16 | 0.96 | 0.38 | 77 |
| 17 | 1.12 | 0.45 | 80 |
| 18 | 1.28 | 0.51 | 75 |

These data indicate that high yields of DDD hydroperoxide are obtained when the molar ratio of bromine to DDD is at least about 0.3, and preferably between 0.3 and 0.5.

Example XI

In run No. 19, the effects of reaction time on the aut-oxidation reaction was studied. 5 grams (0.0155 moles) of DDD in carbon tetrachloride made up to 50 ml. of solution with 0.8 gram (0.005 mole) of bromine was oxidized according to procedure A. The bath temperature was kept constant at 6.5°, and the temperature of the reaction solution was substantially constant at about 10°. The oxygen was pre-saturated with carbon tetrachloride in order to keep the volume of the solution constant. At specified intervals 0.1 ml. of the solution was removed for infrared spectrometry. The hydroperoxide absorption band at $2.84\mu$ and the carbon band at $6.02\mu$ (for 4,4'-dichlorobenzophenone, Formula IV above) were singled out to follow the course of the reaction. The time and absorbance data are listed in Table IV.

TABLE IV

| | Absorbance | |
|---|---|---|
| | $2.84\mu$ | $6.02\mu$ |
| Time, minutes: | | |
| 12 | 0.030 | 0.036 |
| 33 | 0.065 | 0.060 |
| 53 | 0.073 | 0.095 |
| 69 | 0.074 | 0.105 |
| 85 | 0.074 | 0.120 |
| 102 | 0.082 | 0.145 |
| 120 | 0.071 | 0.155 |

These data indicate that, as reaction time increases the amount of DDD hydroperoxide formed becomes generally constant, while the amount of 4,4'-dichlorobenzophenone, an alternate product of the reaction continues to rise at a generally steady rate. For this reason, in order to obtain optimum yields of the hydroperoxide, the reaction time should be relatively short. This example shows that at 10° C., the reaction should be terminated after about 30 minutes. At higher temperatures, the reaction proceeds much more rapidly and when temperatures of about 30–50° C. are used, reaction time should be limited to less than about 10 minutes.

Example XII

In a series of runs, the effect of temperature on the out-oxidation was studied. Runs No. 20 through 23 used procedure B, with 10 g. of DDD dissolved in 100 ml. of carbon tetrachloride containing 1.6 grams of bromine, and aut-oxidized at 40 p.s.i. of oxygen. Various temperature ranges were used. Table V shows reaction times, temperature ranges, and yield of DDD hydroperoxide.

TABLE V

| Run No.: | Time, minutes | Temp. range, °C. | DDD hydroperoxide yield percent of the theoretical |
|---|---|---|---|
| 20 | 5 | 40–52 | 80 |
| 21 | 5 | 52–53 | 79 |
| 22 | 6 | 27–40 | 78 |
| 23 | 6 | 50–53 | 78 |

In runs No. 24 through 28, a modified aut-oxidation was used in order to provide for cooling the reacting system. The pressure bottle of procedure B was placed in a beaker of cooled water, and a magnetic stirrer was used to stir the reactants. 40 ml. of 5% DDD in carbon tetrachloride with 0.32 gram of bromine was aut-oxidized. During the course of the reaction, there was a significant drop in pressure. Table VI lists the temperature and pressure ranges, the reaction times, and the yield of DDD hydroperoxide.

TABLE VI

| Run No.: | Temp. range, °C. | Time, minutes | O₂ pressure range, p.s.i. | DDD hydroperoxide yield percent of theoretical |
|---|---|---|---|---|
| 24 | 0–8 | 50 | 20–13 | 62 |
| 25 | 5–10 | 25 | 20–13 | 55 |
| 26 | 15–23 | 20 | 20–14 | 61 |
| 27 | 25–35 | 10½ | 20–13 | 55 |
| 28 | 38–40 | 7 | 20–14 | 75 |

These data indicate that satisfactory results are achieved over a wide range of temperatures, but that optimum results are achieved when the temperatures are between about 30 and 50°. It should also be noted, that when temperatures below about 30° are used, reaction time is considerably longer.

In addition to 1,1-bis(p-chlorophenyl)2,2-dichloroethyl hydroperoxide, a number of other hydroperoxides encompassed by Formula II have been prepared.

The starting compounds have the general formula

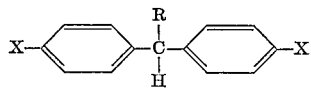

(VIII)

wherein R and X stand for the atoms and groups indicated above in Formula II.

Where R is CHCl₂, the starting compound may be conveniently prepared according to the methods described by Buttenberg in Ann. 279, 324, 1894), by Van Dorp et al. in Rec. Trav. Chim. 69, 289 (1950), or by Riemschneider in Chem. Ber. 92, 894 (1959), according to the following scheme:

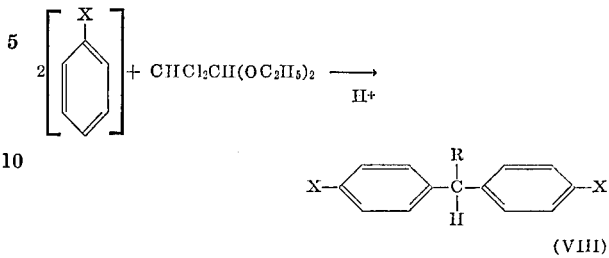

wherein X has the meaning ascribed to it above.

Where R is CHBr₂, the starting compound can be conveniently prepared from dibromoacetal and chlorobenzene, according to the method disclosed in Swiss Patent No. 237,581 (1945).

Where R is carb(lower)alkoxy the starting compound is prepared from diphenylacetic acid

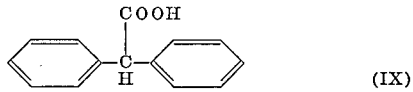

(IX)

or its bis-(p-halo) derivatives. For example, bis(p-chlorophenyl) acetic acid, also known as DDA, can be obtained by hydrolysis of DDT. The acid is then esterified by methods well known in the art to yield the starting compound.

When R is CF₃, a convenient method of preparing the starting compound involves the following steps: (1) A p-halophenylmagnesium bromide is reacted with trifluoroacetic acid to yield a 4'-halo-2,2,2-trifluoroacetophenone.

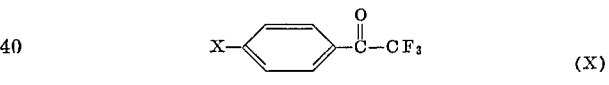

(X)

which is then (2) reduced to the corresponding alcohol either by lithium aluminum hydride or by triethyl phosphite and water and subsequent hydrolysis. Condensation (3) of the alcohol with a halobenzene yields the starting compound.

The reduction of compound (X) in step (2) by triethyl phosphite and water is quite surprising. It was intended to react compound X with triethyl phosphite, according to the method disclosed by Perkow in Chem. Ber. 87, 755 (1954), to obtain 4'-chloro-2,2-difluororstyryl diethyl phosphate, Formula (XI), using the following reaction:

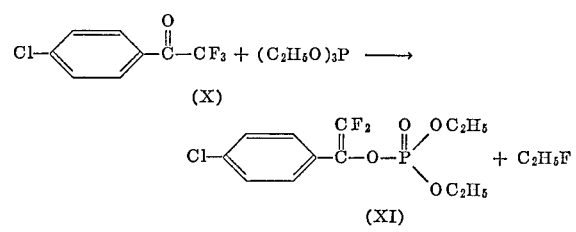

and then to hydrolyze it to 4'-chloro-2,2-difluoroacetophenone, Formula XII.

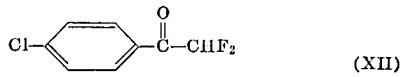

(XII)

The desired reaction did not occur, even after prolonged heating at temperatures up to 110°. The addition of water, however, produced an exothermic reaction, which yielded not the ketone of Formula XII, but the carbinol, 1-(p-chlorophenyl)-2,2,2-trifluoroethanol, Formula XIII.

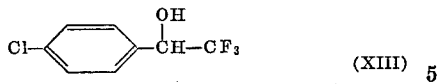
(XIII)

This compound is identical to the compound obtained by reduction with lithium aluminum hydride.

When R is an interhalogen radical such as CHBrCl, the starting compound, rather than having the structure shown in Formula VII, may be, for example, and unsaturated compound having the structure

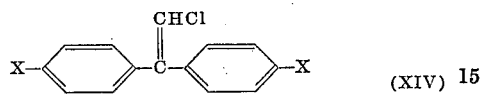
(XIV)

This can be prepared by dehydrochlorination of DDD according to the method taught by Craig et al. in U.S. Patent No. 2,775,591 (1956). Bromination of this compound in the presence of light yields a compound having the structure

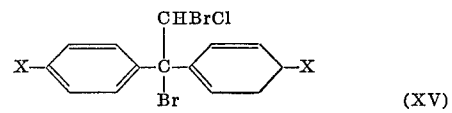
(XV)

and it is this compound which is autoxidized by the methods here described. Alternatively, a compound having the structure of Formula XV may be used as a starting compound.

The preparation of other possible starting compounds may be effected by analogous methods or by other methods well known in the art.

In Examples XIII through XX, various starting compounds prepared according to the above-described methods were autoxidized according to procedure B. The hydroperoxide compounds thus obtained and their properties are listed in Table VII.

TABLE VII

| Compound | Reaction time, minutes | Yield percent of theoretical amount | Melting point, °C. | $\lambda^{CCl_4}_{max.}$ ($\mu$) |
|---|---|---|---|---|
| Example No.: | | | | |
| XIII 1,1-diphenyl-2,2-dichloroethyl hydroperoxide | 6 | 65 | 121.5-123 | 2.88 |
| XIV 1,1-bis(p-fluorophenyl)-2,2-dichloro ethyl hydroperoxide | 4½ | 72 | 43-45 | 2.89 |
| XV 1,1-bis(p-bromophenyl)-2,2-dichloro-ethyl hydroperoxide | 5 | 82 | 92-29 | 2.88 |
| XVI 1,1-bis(p-chlorophenyl)-2,2-dibromo-ethyl hydroperoxide | 6 | 83 | 45-50 | 2.90 |
| XVII 1,1-bis(p-chlorophenyl)-2-chloro-2-bromo ethyl hydroperoxide | 4 | 83 | | 2.85 |
| XVIII Ethyl-2,2-diphenyl-2-hydroperoxy-acetate | 5 | 55 | | 2.89 |

TABLE VII—Continued

| Compound | Reaction time, minutes | Yield percent of theoretical amount | Melting point, °C. | $\lambda_{max.}^{CCl_4}$ ($\mu$) |
|---|---|---|---|---|
| Example No.: | | | | |
| XIX ... Cl—⟨⟩—C(COOC₂H₅)(OOH)—⟨⟩—Cl<br>Ethyl-2,2-bis(p-chlorophenyl)-2-hydroperoxy-acetate | 6½ | 55 | | 2.89 |
| XX ... Cl—⟨⟩—C(CF₃)(OOH)—⟨⟩—Cl<br>1,1-bis(p-chlorophenyl)-2,2,2-trifluoro-ethyl hydroperoxide | 25 | 56 | | 2.82 |

The hydroperoxide compounds of this invention are useful as insecticides. The invention therefore also encompasses a method of combatting insects by applying to the insects or to loci infested by said insects, an insecticidally affective amount of these hydroperoxide compounds. Compositions containing these compounds may be prepared by methods analogous to methods of preparing DDT or DDD compositions and may be in the form of sprays, liquids, etc. The following example illustrates the insecticidal effectiveness of these compounds.

Example XXI

The insecticidal activity of various compounds having the structure of Formula II was investigated on houseflies and three species of mosquito larvae. The data are set forth in Table VIII.

It can thus be seen that these hydroperoxide compounds possess insecticidal activity and show promise as effective insecticides against some DDT-resistant species.

I claim:
1. A compound of the formula

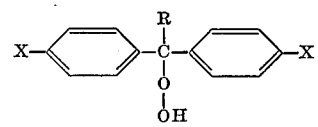

wherein:
X is hydrogen, fluorine, chlorine or bromine; and
R is dihalomethyl whose halogen atoms are selected from fluorine, chlorine and bromine; trifluoromethyl; or carb(lower)alkoxy.

2. A compound according to claim 1 in which X is fluorine, chlorine or bromine.
3. A compound according to claim 2 which is 1,1-bis(p-chlorophenyl)-2,2-dichloroethyl hydroperoxide.
4. A compound according to claim 2 which is 1,1-bis(p-bromophenyl)-2,2-dichloroethyl hydroperoxide.

TABLE VIII

| | Mosquito larvae | | | | House Flies—M. domestica | |
|---|---|---|---|---|---|---|
| | C. Tarsalis | | | | | |
| | Susceptible to DDT | Resistant to DDT | C. quinque-fasciatus | A. albimanus | Susceptible to DDT | Resistant to DDT |
| Compound | LC₅₀, p.p.m.w. | LC₅₀, p.p.m.w. | LC₅₀, p.p.m.w. | LC₅₀, p.p.m.w. | LC₅₀, μg. 1 ♀ fly | LC₅₀, μg. 1 ♀ fly |
| 1,1-bis(p-chlorophenyl)-2,2-dichloroethyl hydroperoxide (Example III) | 0.2 | 0.3 | 0.6 | 0.5 | 1.3 | >10 |
| 1,1-bis(p-bromophenyl)-2,2-dichloroethyl hydroperoxide (Example XV) | 0.2 | >10 | 0.5 | 0.3 | 2.3 | >10 |

References Cited
FOREIGN PATENTS
726,362    3/1955    Great Britain.

BERNARD HELFIN, Primary Examiner
W. B. LONE, Assistant Examiner

U.S. Cl. X.R.
260—469; 424—308, 338